Dec. 28, 1954 I. KAYE 2,698,152

BASE FOR RADIO AND TELEVISION SETS

Filed June 15, 1951 2 Sheets-Sheet 1

Irving Kaye INVENTOR.

BY Joseph J. Duland
his attorney

Dec. 28, 1954

I. KAYE 2,698,152

BASE FOR RADIO AND TELEVISION SETS

Filed June 15, 1951

2 Sheets-Sheet 2

Irving Kaye
INVENTOR.

BY Joseph J. Dinhan
his Attorney

United States Patent Office 2,698,152
Patented Dec. 28, 1954

2,698,152

BASE FOR RADIO AND TELEVISION SETS

Irving Kaye, Forest Hills, N. Y.

Application June 15, 1951, Serial No. 231,870
4 Claims. (Cl. 248—149)

This invention relates to cabinets or supporting structures especially adapted for radio and television sets and other articles, and has for its primary object the provision of a cabinet structure which will cooperate with a so-called "table model" of a radio or television set in a manner to create the impression that such model is of the console type.

At the present time, table model radio and television sets are usually supported upon long-legged tables which not only present an ungraceful appearance, and detract from any beauty of design which the radio or television cabinet may have, but often are of uncertain strength and sometimes provide an insecure support for the set.

It is, therefore, one of the objects of the present invention to provide a cabinet structure upon which a table model radio or television set is rested, such cabinet structure presenting the appearance, when the radio or television set is rested upon it, of a console cabinet.

It is another object of the invention to provide a supporting structure of the above-described character which is adjustable to enable it to fit radio or television sets of various sizes and to so fit the sets that the impression will be created that the support was particularly designed for the set and that the set and its supporting structure are an integral console cabinet.

It is still another object of the invention to provide a cabinet structure of this kind in which the several parts which are adjustably connected and can be joined in operative relation by the purchaser without the use of tools, thus enabling the device to be packed and shipped in "knock-down" form for ready assembly by the purchaser.

More particularly, the invention contemplates the provision of a cabinet resembling the loudspeaker housing of a console, so that when the radio or television set is rested upon it, the appearance of a console having its lower portion provided with a speaker, will be the result.

In the accompanying drawings, wherein an illustrative embodiment of the invention is disclosed, Fig. 1 is a top plan view of a cabinet or supporting structure, constructed in accordance with the invention;

The improved cabinet or supporting structure is primarily intended for the support of a table model radio or television set and is adapted to cooperate with such set when the same is rested upon the cabinet, to produce the effect of a console cabinet. The supporting device is shown in front elevational view in Fig. 2, wherein a portion of a radio or television set is shown at 32 diagrammatically in place on the cabinet. The cabinet or support is composed of three main parts, namely, two similar paired side members 1 and 2 and a front central panel indicated at 3.

Figures 5, 6, 7:
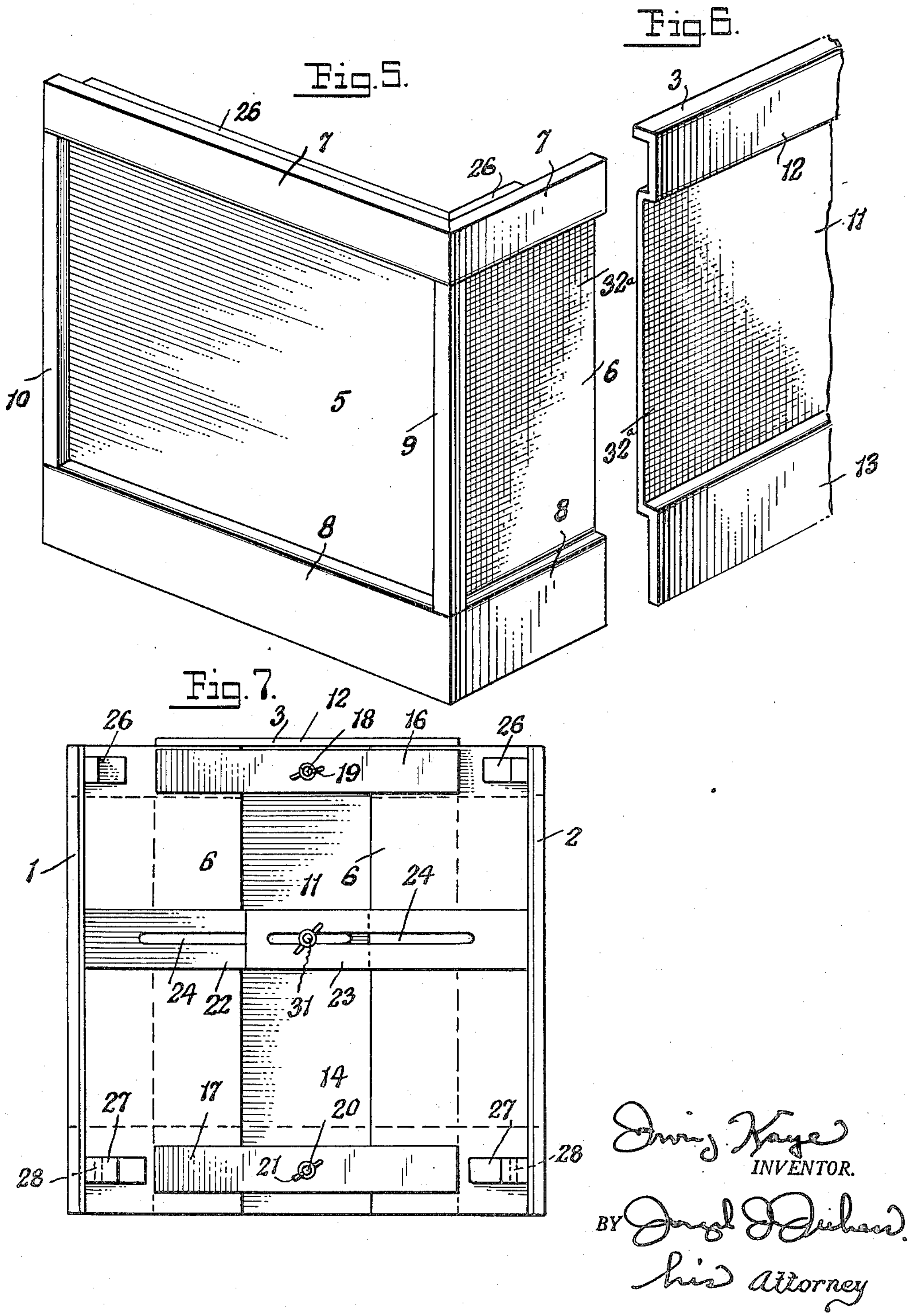
Fig. 5 is a perspective view of one of the side members.
Fig. 6 is a perspective view of a portion of the center panel.
Fig. 7 is a rear elevational view of the cabinet or supporting structure.

The side members 1 and 2 are substantially similar in construction and one of these side members is most clearly disclosed in Fig. 5. It will be therein noted that the same includes a side wall panel 5, from which extends at right angles a front wall section or wing 6. At the top of each of the side members 1 and 2 is provided a reinforcing strip 7 and at the bottom is provided a similar strip 8. Corner braces 9 may also be employed to strengthen the structure, and a rear end brace 10 might also be used. These angular side members 1 and 2 may be otherwise reinforced or constructed to be possessed of sufficient strength and rigidity to support the radio or television sets intended to be placed on the cabinet.

The front panel 3 of the cabinet is provided with a panel section 11, and a channelled upper reinforcing strip 12 at the top intended to fit over the strip 7 at the top of the front wings 6. At the bottom, the panel member 3 is provided with a lower angular strip 13 adapted to fit over the lower strip 8 on the front wings 6 of the side members 1 and 2.

The side members 1 and 2 are adapted to be adjusted to or from one another to accommodate radio or television sets of various widths and any spacing or separation between the ends of the wings 6, as indicated at 14 in Fig. 7, will be bridged and thus covered and concealed by the front panel 3. Said panel 3 is of sufficient width to enable it to fit over and cover this space regardless of the extent of separation of the wings 6 to the limits of most radio or television sets.

Figures 1, 2, 3, 4:
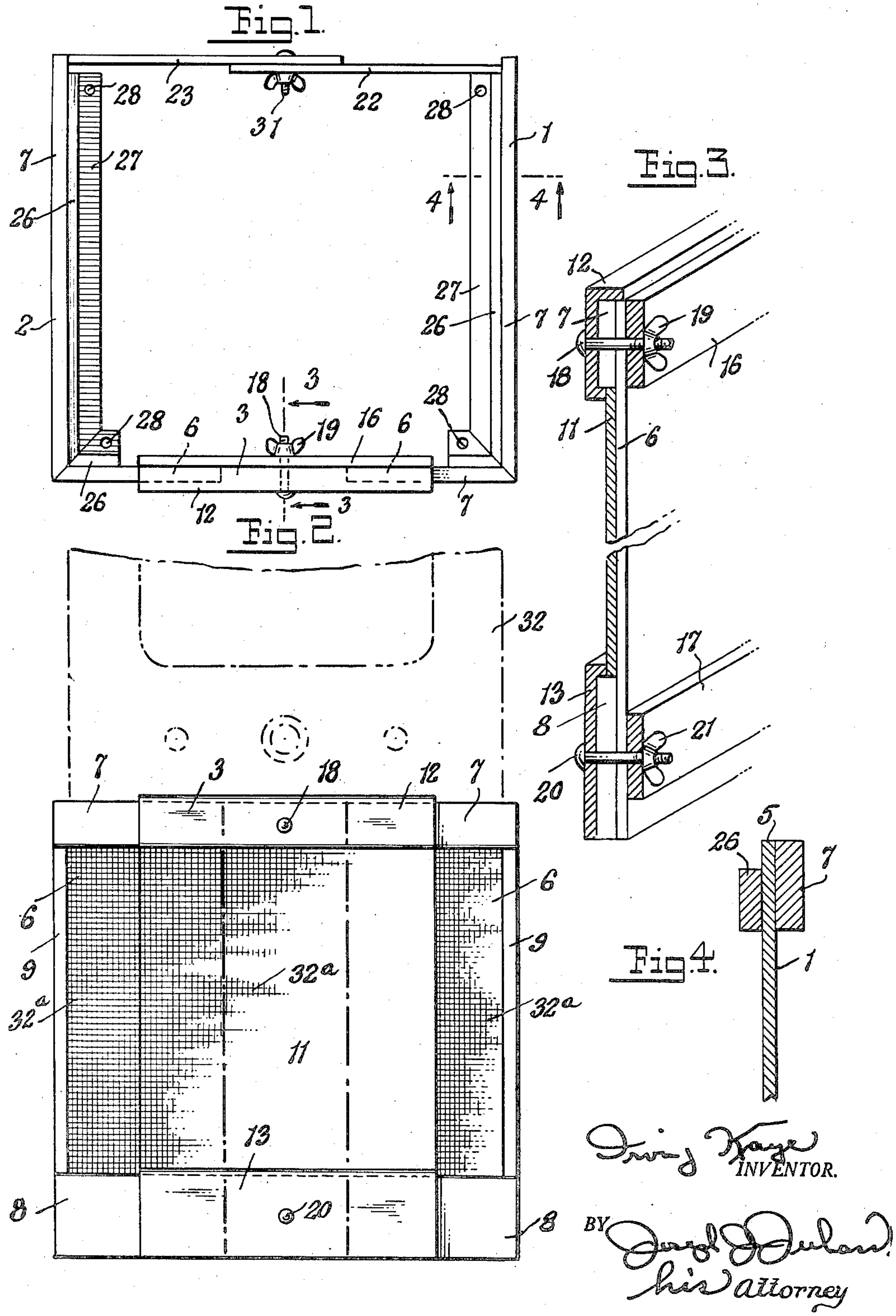
Fig. 2 is a front elevational view of the same.
Fig. 3 is a sectional view in perspective, taken substantially on the line 3—3 of Fig. 1 looking in the direction of the arrows.
Fig. 4 is a sectional view taken on the line 4—4 of Fig. 1 looking in the direction of the arrows.

The front panel 3 and the side members 1 and 2 are held in cooperative relationship by clamping means best seen in Figs. 1 and 7. It will be therein noted that at the back of the front panel 3 is provided a pair of clamping strips indicated respectively at 16 and 17. The upper one of such strips, or that indicated at 16, is located behind the top reinforcing strip 12 of the front panel 3 and it has its opposite end portions fitting behind the wing sections 6 of the side members 1 and 2. A bolt 18, adjusted by the wing nut 19, passes through the strip 12 and extends through the clamping strip 16, and when this bolt is tightened it will firmly clamp the parts of the wings 6 between the strip 12 and the clamping strip 16 to thus securely and immovably hold the wing parts 6 and thus hold the side members 1 and 2 of which these wings are a part, in a selected relationship to hold any radio or television set of predetermined width.

The clamping strip 17 at the bottom of the cabinet is also held by the bolt 20 into clamping relation with the wing portions 6 as explained with respect to the bolt 18, the bolt 20 being tightened by the wing nut 21.

Through the arrangement disclosed, a three-walled supporting structure is produced, and one in which the two side walls 1 and 2 are adjustable relatively to one another to increase or decrease the effective width of the structure. The structure is further braced at its open back by means of the brace strips 22 and 23 which are respectively secured to the side members 1 and 2 and overlap one another at the back of the cabinet. Each of the brace strips is provided with an elongated slot 24, and a bolt 31 is extended through these registering slots to hold the brace strips at the required position of overlap according to the spacing-apart of the side members 1 and 2 of the cabinet.

Within the cabinet and closely adjacent to the top thereof is a ledge 26 or other suitable support on which the radio or television set is rested, and the interior of the cabinet may also be provided near the bottom with a reinforcing strip 27 that may be apertured as shown at 28 for the reception of casters or sliders on which the cabinet may be supported.

The cabinet or supporting structure as herein described may be made in numerous ornamental forms, it being desirable, however, that the same shall resemble as far as possible the lower portion of a console cabinet so that when a radio or television set of the table model variety is rested upon it as shown at 30 in Fig. 2, the cabinet or supporting structure shall present the appearance of a downward extension of the radio or television cabinet and cooperate therewith to produce the effect of a single attractive console cabinet. This effect is enhanced by covering the wing sections 6 of the side members 1 and 2, as well as the panel part 11 of the front panel member 3 with speaker grill fabric as indicated at 32*a*, so that the cabinet then presents the aspect of the loudspeaker chamber or housing of a console cabinet. The heads of the bolts 18 and 20 which are visible at the front of the cabinet, as seen in Fig. 1, can be covered or concealed so as not to detract from the appearance of the cabinet and the cabinet may be ornamented in various other ways to meet requirements.

Since the cabinet elements are held together in assembled relationship merely by the three bolts 18, 20 and 25, it is obvious that the cabinet may be shipped in a knocked-down condition and the purchaser can easily assemble it without the use of tools and readily adjust it to fit the particular radio or television set intended to be accommodated by the cabinet.

What I claim is:

1. A supporting structure for radio or television table model sets by means of which the effect of a console cabinet is attained, said structure being in the form of a three-walled support extending from the bottom of the set to the floor and thus providing a supporting device presenting the appearance of a downward, integral cabinet of which the set appears to form a part, said structure including a pair of parallel side walls capable of adjustment to or from one another, each side wall being provided at its forward end with a right-angle wing-like extension, said wing-like extensions being spaced apart from one another, the front wall of the structure including a closed panel having its ends overlapping and disposed on the outside of the wing-like extension to an extent required to cover the ends of said extensions and provide a front wall of required width and to locate the side walls at the proper distance apart to enable them to form the effect of downward side wall extensions of the radio set, means at the back of the wing-like extensions and front panel for clampingly maintaining the same in their overlapping relation, overlapping brace members at the rear of the side walls for connecting said side walls, and a set supporting ledge at the top of the side walls and wing-extensions thereon.

2. A supporting structure for radio or television sets comprising a cabinet having a pair of side walls, each side wall being provided at its forward end with an inwardly-projecting right-angled extension, the ends of said extensions being spaced apart, a front panel fitted on the outside of said extensions and overlapping the same and covering and concealing the ends of the extensions, the side walls being adjustable to or from one another to thereby vary the overlap of the extensions by the front panel, means for maintaining the position of the front panel, relatively to the extensions, consisting of a clamping strip disposed behind the front panel and bridging the space between the extensions, said clamping strip being concealed behind the front panel and being held in its clamping position by a fastening element, an adjustable brace extending between the side walls at the rear edges thereof, and a set-supporting ledge at the top of the side walls and the extensions thereon.

3. In an expansible cabinet, first and second vertical side frames, the first side frame having a rear horizontal bar fixed to and extending laterally inwardly from the rear portion of the first frame and front upper and lower horizontal bars fixed to and extending laterally inwardly from forward portions of said first frame, the second side frame having a rear horizontal bar fixed to and projecting laterally inwardly from a rear portion of said second side frame, said second side frame having front upper and lower bars fixed to and extending laterally inwardly from forward portions of said second frame, the rear horizontal bars of the side frames being in overlapping and sliding relation, first means for clamping the overlapped rear bars together in longitudinally adjusted relation to each other, the front and upper lower bars being shorter than the rear bars and having their inwardly-extending free ends in longitudinally-spaced relation to each other, front panels secured to and extending between the upper and lower front bars of each of the side frames, and a front frame slidably engaged with the front faces of said front panels, and second means acting between said front frame and said front panels for securing the front bars in longitudinally-adjusted relation to each other.

4. In an expansible cabinet, first and second vertical side frames, said first side frame having a rear horizontal bar fixed to and extending laterally inwardly from a rear portion of said first frame and front upper and lower horizontal bars fixed to and extending laterally inwardly from forward portions of said first frame, said second side frame having a horizontal bar fixed to and projecting laterally from a rear portion of said second side frame, the rear bars of the side frames being in overlapping and sliding relation said second side frame having front upper and lower bars fixed to and extending laterally inwardly from forward portions of said second frame, first means for clamping the overlapped rear bars together in longitudinally adjusted relation to each other, the front upper and lower bars being shorter than the rear bars and having their inwardly extending free ends in longitudinally spaced relation to each other, front panels secured to and extending between the upper and lower bars of each of said side frames, and a front frame slidably engaged with the front faces of said front panels, and second means acting between said front frame and said front panels for securing the front bars in longitudinally adjusted relation to each other, said first and second side frames and said front frame being rectangular and comprising vertically-spaced horizontal members and horizontally spaced vertical members connected to the horizontal members, a panel secured to the laterally outward side of each of said side frames, and a covering secured to the front side of said front frame.

References Cited in the file of this patent

UNITED STATES PATENTS

| Number | Name | Date |
|---|---|---|
| 1,217,465 | Lewis | Feb. 27, 1917 |
| 1,595,007 | Kindrat | Aug. 3, 1926 |
| 2,266,850 | Connor et al. | Dec. 23, 1941 |
| 2,338,092 | Brown | Jan. 4, 1944 |
| 2,359,491 | Ring | Oct. 3, 1944 |
| 2,500,037 | Katz | Mar. 7, 1950 |
| 2,643,083 | Troutman | June 23, 1950 |